(12) United States Patent
Fukazawa et al.

(10) Patent No.: US 8,695,722 B2
(45) Date of Patent: Apr. 15, 2014

(54) BULLDOZER WITH IMPROVED VISIBILITY

(75) Inventors: Kazumasa Fukazawa, Chattanooga, TN (US); Masayuki Mukaino, Chattanooga, TN (US); David Andrews, Hixson, TN (US)

(73) Assignee: Komatsu Ltd., Tokyo (JP)

( * ) Notice: Subject to any disclaimer, the term of this patent is extended or adjusted under 35 U.S.C. 154(b) by 700 days.

(21) Appl. No.: 10/681,253

(22) Filed: Oct. 9, 2003

(65) Prior Publication Data

US 2005/0077062 A1    Apr. 14, 2005

(51) Int. Cl.
*E02F 3/76*    (2006.01)

(52) U.S. Cl.
USPC .......................................... 172/811; 180/69.2

(58) Field of Classification Search
USPC ................. 37/443, 466; 180/68.4, 68.1, 69.2; 172/811
See application file for complete search history.

(56) References Cited

U.S. PATENT DOCUMENTS

| | | | | |
|---|---|---|---|---|
| 2,247,962 A * | 7/1941 | Ormsby et al. | ............... | 180/68.1 |
| 2,503,411 A * | 4/1950 | Prouse | ........................... | 180/68.4 |
| 2,789,647 A * | 4/1957 | Couse | ........................... | 180/53.1 |
| 3,451,494 A * | 6/1969 | Kowalik | ....................... | 414/697 |
| 3,715,001 A * | 2/1973 | Wilson | ........................... | 180/68.4 |
| 3,827,523 A * | 8/1974 | Williams | ....................... | 165/44 |
| 3,929,202 A * | 12/1975 | Hobbensiefken | ............. | 180/68.4 |
| 3,934,644 A * | 1/1976 | Johnston | ....................... | 165/51 |
| 3,978,938 A * | 9/1976 | Joscher et al. | ............... | 180/68.4 |
| D251,845 S | 5/1979 | Joupperi et al. | | |
| 4,362,208 A * | 12/1982 | Hauser | ............................. | 165/51 |
| 4,448,274 A * | 5/1984 | van der Lely | .................... | 180/15 |
| D274,333 S | 6/1984 | Meisel, Jr. et al. | | |
| 4,590,891 A * | 5/1986 | Fujikawa et al. | .......... | 123/41.11 |
| 4,821,808 A * | 4/1989 | Gurries | ........................... | 172/40 |
| 6,009,643 A * | 1/2000 | Maeba et al. | .................... | 37/443 |
| 6,152,253 A | 11/2000 | Monaghan et al. | | |
| 6,308,795 B2 * | 10/2001 | Sewell | ......................... | 180/68.4 |
| 6,443,253 B1 * | 9/2002 | Whitehead et al. | .......... | 180/68.1 |
| 6,468,153 B2 * | 10/2002 | Sheidler et al. | ............... | 460/100 |
| D483,043 S * | 12/2003 | Akashima et al. | ............. | D15/24 |
| 6,793,028 B2 * | 9/2004 | Pack | ............................ | 180/68.1 |
| 2001/0006128 A1 * | 7/2001 | Contoli et al. | ............... | 180/68.4 |
| 2001/0015296 A1 * | 8/2001 | Sewell | ......................... | 180/68.4 |
| 2002/0030397 A1 | 3/2002 | Tamura et al. | | |
| 2002/0053480 A1 * | 5/2002 | Pack | ............................ | 180/374 |
| 2003/0156937 A1 | 8/2003 | Brown et al. | | |

FOREIGN PATENT DOCUMENTS

| | | |
|---|---|---|
| EP | 1114897 A | 7/2001 |
| JP | 51-63032 U | 5/1976 |
| JP | 61-84127 U | 6/1986 |
| JP | H3-49114 | 5/1991 |
| JP | 05-106240 | 4/1993 |
| JP | 2002/235339 A | 8/2002 |
| JP | 2002/206253 A | 7/2006 |

* cited by examiner

*Primary Examiner* — Jamie L McGowan

(74) *Attorney, Agent, or Firm* — Global IP Counselors, LLP

(57) ABSTRACT

A bulldozer provides improved visibility in front and/or rear of the bulldozer. The bulldozer includes an engine arranged in the front of the bulldozer and a cooling module for cooling the engine arranged elsewhere in the bulldozer, such as behind driver's seat. In the bulldozer, the arrangement of the engine, the vehicle, and the cooling module provides improved visibility in front of the bulldozer so that the operator of the bulldozer can view the upper middle portion of the bulldozer blade.

26 Claims, 8 Drawing Sheets

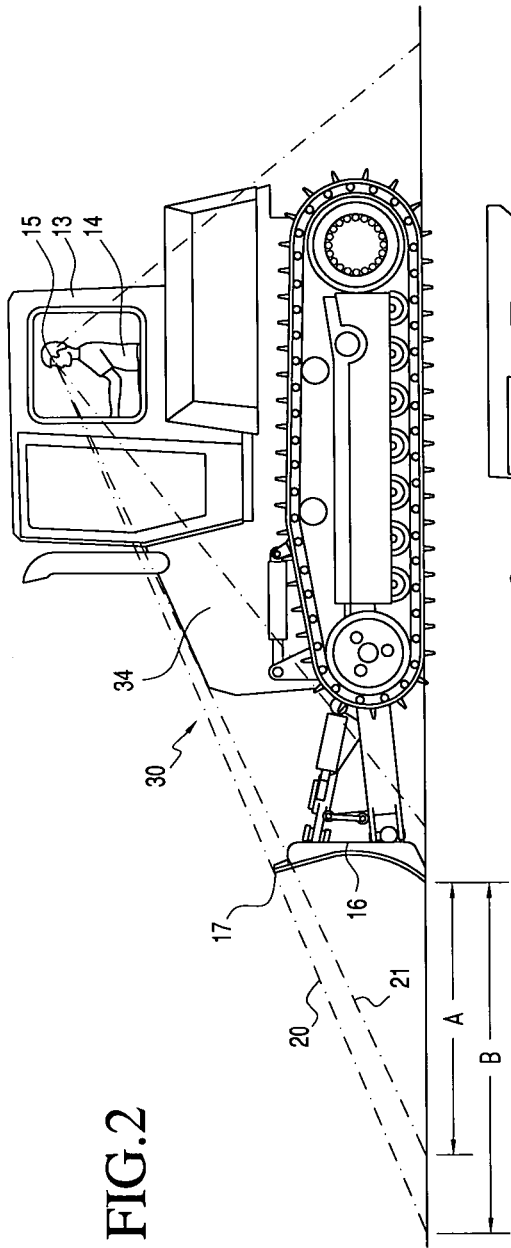
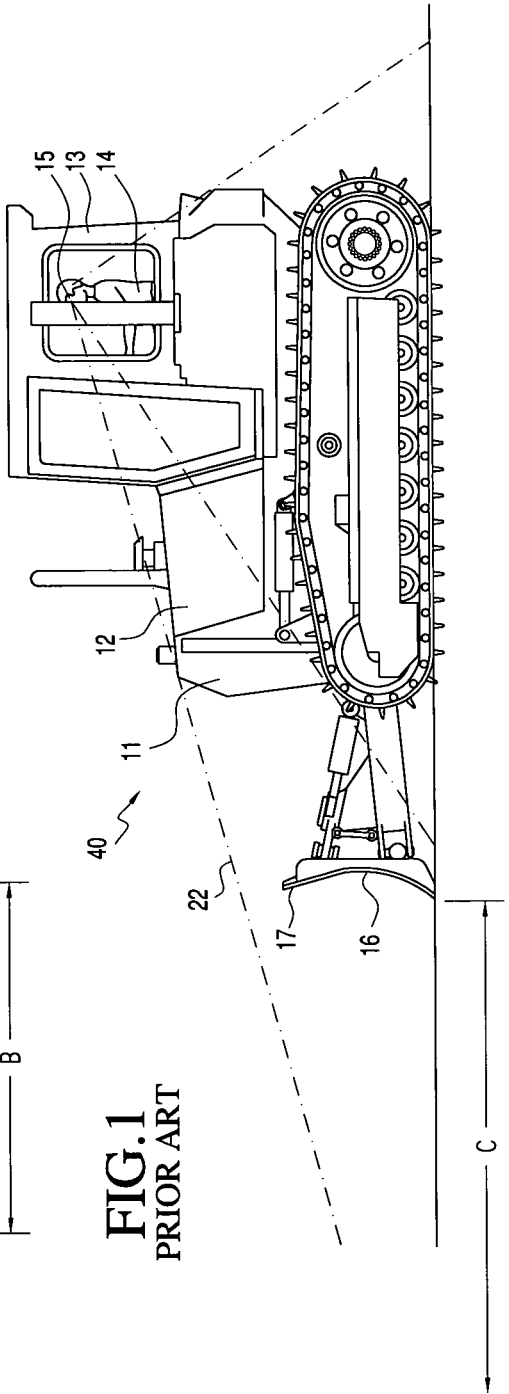
FIG.2
FIG.1
PRIOR ART

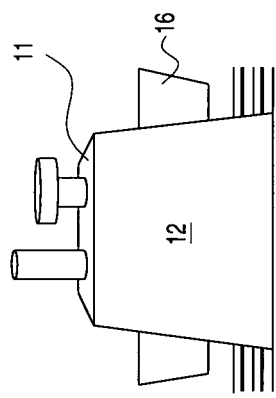
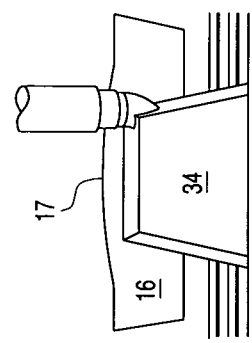
FIG.6(a)
FIG.6(b) PRIOR ART

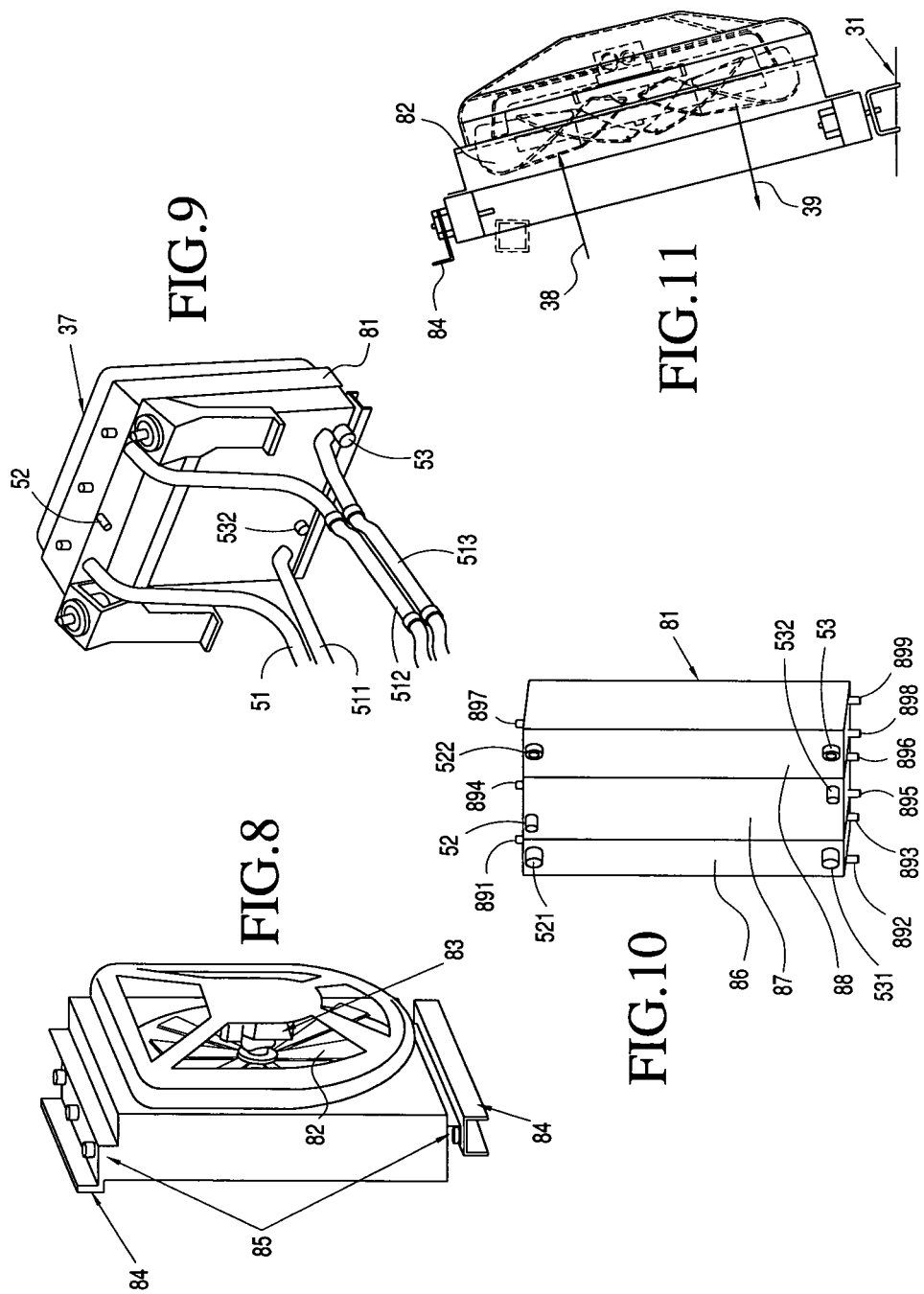

BULLDOZER WITH IMPROVED VISIBILITY

BACKGROUND OF THE INVENTION

1. Field of the Invention

The present invention relates to a bulldozer where improved visibility for the bulldozer is provided. The improved visibility can be achieved by arranging the engine at the front of the bulldozer, while arranging the cooling module or radiator assembly for cooling the engine in a rear of the bulldozer.

2. Description of the Related Art

In a work vehicle, particularly, in a bulldozer, the engine is mounted at the front of the vehicle, and the radiator assembly 11 for cooling the vehicle engine is arranged in front of the engine. A conventional bulldozer 40 is shown in FIG. 1. In the conventional bulldozer, the radiator assembly 11 is arranged in front of the engine and engine compartment. A hood 12 covers the engine compartment, and a cabin or cab 13 is arranged near the back end of the work vehicle. When operating the conventional bulldozer, the visibility of the operator 14 is blocked by the radiator or radiator assembly 11 and the hood 12. As shown in FIG. 1, the operator of the conventional bulldozer 40 cannot see the top center portion 17 of the bulldozer blade 16. In particular, the lowest line of sight 22 from the eye point 15 of the operator 14 must pass over the top of the radiator assembly 11 and hood 12. FIG. 6(b) shows the operator's view from within the cab of a conventional bulldozer. As shown therein, the operator's view is blocked by engine cover or hood 12 and the radiator assembly 11. In particular, the operator can only see the ends of the blade 16, and the center of the blade 16 is completely blocked by the radiator assembly 11 and the hood 12. Due to the fact that the operator cannot see the center of the blade, it is easy for the material being moved by the blade to heave or rise over the top center portion 17 of the blade 16. This leads to inefficient movement of material and can cause problems. In addition, since the forward vision of the operator of the conventional work vehicle or bulldozer is blocked by radiator assembly 11 and hood 12, the operator must estimate the location of the bulldozer blade during use, based on his or her experience. These estimates can easily be off by a few inches or more, which can result in damaging the surface below the desired depth or by not removing material to the desired depth, either of which increases time and costs.

The size of the radiator in a work vehicle, such as a bulldozer, is defined by the heat rejection needs of the engine. The radiator in the cooling module or radiator assembly must be a certain size in order to obtain the heat rejection necessary for the engine used. Therefore, the forward visibility of the operator cannot be improved by reducing the size of the radiator. Normally, when designing work machines, the size of the radiator is firstly determined, and then the machine is designed around the radiator with the predetermined size. Since the radiator must be a certain size, when it is arranged in the front of the vehicle, it necessarily will block the forward visibility of the operator of the work vehicle. The present invention overcomes the aforesaid disadvantages and other disadvantages of the conventional work vehicle.

SUMMARY OF THE INVENTION

The present invention focuses attention on the aforementioned problems of conventional work vehicles and provides a work vehicle where the radiator assembly or cooling module is removed from the front of the work vehicle, such as in front of the engine and/or in front of the engine compartment, to another location on the work vehicle. This arrangement permits the engine compartment to be made smaller, so that the front end of the engine compartment cover can be pushed downward. The arrangement of the present invention enables the operator of the work vehicle to view the ground in front of the work vehicle closer to the work vehicle. If the work vehicle is a bulldozer, the present invention enables the operator of the bulldozer to see the top center portion of the bulldozer blade.

In addition to the above, the present invention includes moving the cab closer to the front of the work vehicle. This arrangement also permits the operator of the work vehicle to see more of the ground in front of the work vehicle, which ground is closer to the work vehicle. If the work vehicle is a bulldozer, this arrangement of the present invention permits the operator of the bulldozer to see more of the top center of the bulldozer blade.

BRIEF DESCRIPTION OF THE DRAWINGS

Other features and advantages of the present invention will be understood from the following "Detailed Description of the Invention," made with reference to the appended drawings in which:

FIG. 1 is a side view of a conventional bulldozer including forward and rearward lines of sight for the operator.

FIG. 2 is a side view of a bulldozer in accordance with the present invention including forward and rearward lines of sight for the operator.

FIG. 6(a) is a view from the eye point within the cab of a bulldozer in accordance with the present invention.

FIG. 6(b) is a view from the eye point within the cab of a conventional bulldozer.

FIG. 8 is a perspective view of a fan assembly for a cooling module in accordance with the present invention.

FIG. 9 is a perspective view of a cooling module in accordance with the present invention.

FIG. 10 is a perspective view of a core element for a cooling module in accordance with the present invention.

FIG. 11 is a perspective view of a fan assembly for a cooling module in accordance with the present invention.

DETAILED DESCRIPTION OF THE INVENTION

Figure 3:
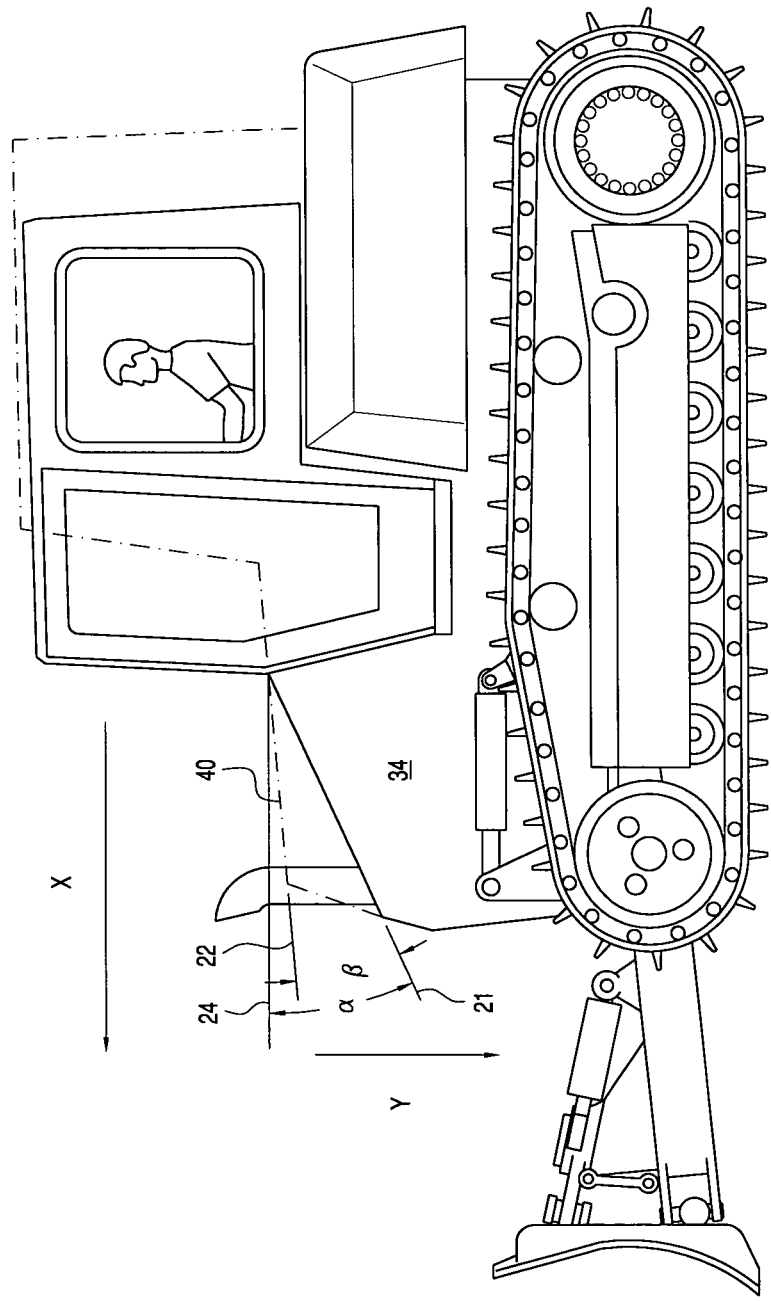
FIG. 3 is a side view comparing the present invention with a conventional bulldozer.

Referring to the drawings and, more particularly, to FIGS. 3, 4, 5, and 7, a simplified view of a work vehicle 30 is shown according to the present invention. The mainframe module or vehicle frame 31 of this work vehicle is supported by track frame modules 32, which are arranged at the left and right sides of the mainframe module or vehicle frame 31. The work vehicle 30 includes an engine 33 and engine compartment arranged adjacent the front of the mainframe module or vehicle frame 31. A nose module 34 covers the engine and engine compartment. The nose module 34 can be a one-piece nose module. A cabin or cab 13 accommodates an operator's seat, an instrument panel, a steering mechanism, etc. The cabin or cab 13 is secured to the mainframe module or vehicle frame 31 and arranged behind the engine 33 and engine compartment, which are covered by the nose module 34. Cab 13 is elastically supported by cab support members (not shown). An hydraulic tank module 35 for supplying hydraulic fluid to working implements of the work vehicle, such as for operating the bulldozer blade 16 etc., is arranged at a side of the cab 13 near the bottom of the cab 13, and a fuel tank module 36 for supplying fuel to the engine 33 is arranged at another bottom side of the cab 13 near the bottom of the cab 13.

Figure 5:
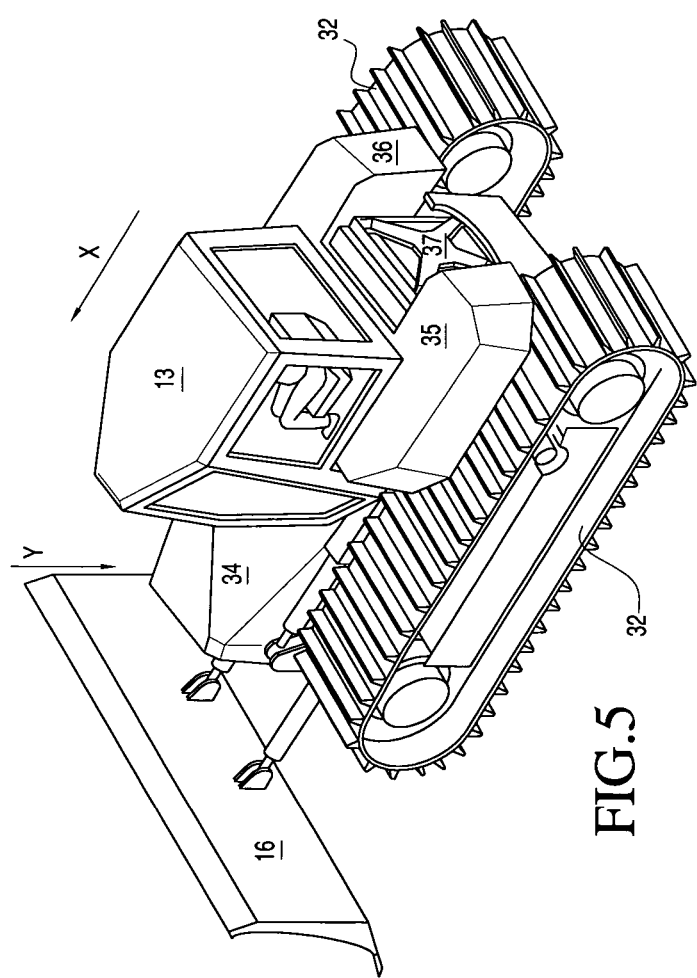
Figure 7:
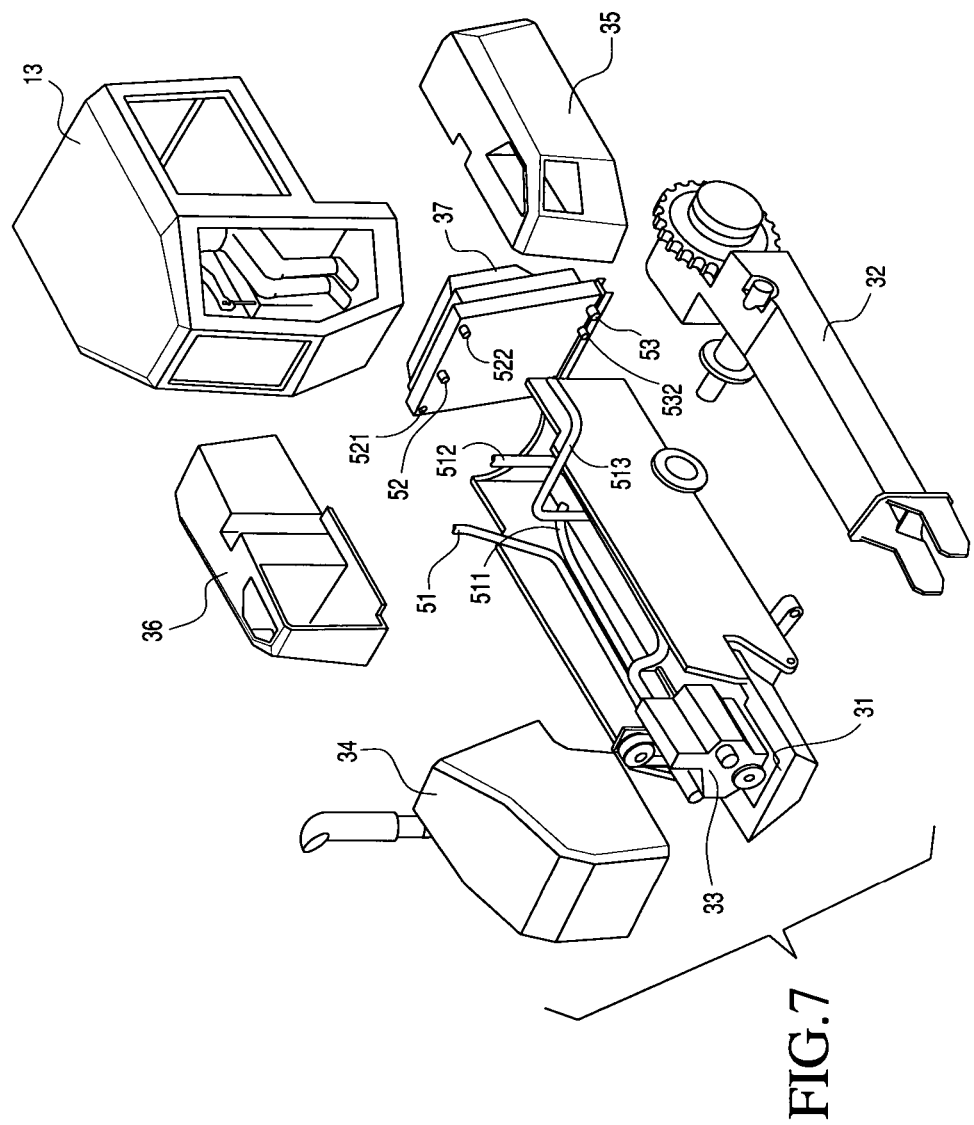
FIG. 7 is an exploded view of a bulldozer in accordance with the present invention.

A radiator assembly or cooling module 37 can be arranged at the rear of the work vehicle. As shown in FIG. 5, the cooling module 37 can be arranged behind the cab 13 and between the rear ends of the hydraulic tank module 35 and fuel tank module 36. This arrangement provides excellent visibility behind the work vehicle, because the operator can see over the cooling module 37 and between the hydraulic tank module 35 and the fuel tank module 36. The cooling module can include a radiation core 81, with a charged air cooling (CAC) unit 86, oil cooling unit 87, water cooling unit 88, and a fan 82, as shown in FIGS. 8, 9, 10, and 11. The radiator assembly can be fixed to the main body by mount brackets 84 secured by pins or bolts 891, 894, 897, 892, 893, 895, 896, 898, and 899 as shown in FIGS. 8 and 10. The bolts or pins are fitted in upper and lower rubber mounts or other cushioning material 85 that can be sandwiched between the radiator assembly and the main body. The lower mount bracket 84 in FIG. 8 is installed with the mainframe module 31 shown in FIG. 7; the upper mount bracket 84 is installed with the gate type (π type) bracket and installed in the mainframe module 31. Other known methods can also be used for securing the radiator assembly to the main body.

The direction of airflow through the radiator 81 can be from left to right as shown by arrow 38 in FIG. 11. When cleaning is necessary the air can be forced to flow in a reverse direction following arrow 39 as shown in FIG. 11. The fan 82 can be driven electrically or hydraulically, independent of the engine, such as by an electrical motor or a hydraulic motor 83. In a preferred arrangement, a hydraulic fan drive is used to vary the fan speed. As shown in FIGS. 7-10, cooling fluid conduits 512 and 513 are connected to inlet 522 and outlet 53 of the cooling module 37 and pass charged air between the cooling module and the engine for cooling engine intake air. Similarly, conduits 51 and 511 are connected to inlet 521 and outlet 531 of the cooling module 37 for cooling engine cooling fluid. Additional conduits (not shown) connect to inlet 52 and outlet 532 of the cooling module 37 for providing cooled fluid to the hydraulic system of the vehicle.

In the present invention, the radiator assembly or cooling module 37 is removed from the engine compartment. For example, the cooling module 37 including the fan 82 and the radiation core 81 can be moved elsewhere in the work vehicle to a location not between the operator's eye point in the cab 13 and the bulldozer blade 16, so that it does not impede visibility of the bulldozer blade 16. Preferably, the cooling module is arranged behind the cab 13. Without the cooling module 37 or radiator core 81 of the cooling module, the engine compartment can be reduced in size and the engine can be moved forward. Reducing the size of the engine compartment and/or moving the engine forward, allows the vehicle cab 13 to be moved forward. This arrangement improves the operator's visibility in the front of the work vehicle by providing a wider angle of forward visibility for the operator of the work vehicle.

In addition, removing the radiator assembly or cooling module 37 from the engine compartment allows the engine cover or nose module 34, which covers the engine compartment, to be made smaller. The engine compartment and thereby the cover or nose module 34 can be made smaller in volume, by reducing any of the three dimensions of width, height, and depth. Reducing the height of the front end of the nose module 34 is preferred, because this arrangement significantly improves the operator's visibility in the front of the work vehicle without diminishing the operator's visibility in the rear of the work vehicle. In this preferred embodiment, the nose module has a top that slopes downward, more preferably steeply downward, from the middle portion of the vehicle toward the front of the vehicle. As shown in FIGS. 2 and 6(a), the top center portion 17 of the bulldozer blade 16 is within the operator's view in accordance with the present invention. This is not possible in the conventional arrangement shown in FIGS. 1 and 6(b).

As shown in FIG. 2, the lowest line of sight 21 from the eye point 15 of the operator 14 in a bulldozer in accordance with the present invention passes over the top of the nose module 34, so that the upper center portion 17 of the bulldozer blade is visible to the operator. An important advantage of the present invention is that the operator can see above the top center portion 17 of the bulldozer blade as shown by line of sight 20. This enables the operator of the bulldozer to monitor heaving or rising of any material above the top center portion 17 of the blade 16, when operating the bulldozer. In addition, the arrangement of the present invention does not adversely affect rear visibility in that the rear visibility for the conventional bulldozer and for the work vehicle in accordance with the present invention is about the same. The rear perspective view in FIG. 5 shows that the operator can see over the cooling module 37 between the hydraulic tank module 35 and the fuel tank module 36. In this arrangement, rear visibility is limited by the cabin or cab 13.

Attention is directed to FIG. 3 of the present application, where the arrangement of the work vehicle in accordance with the present invention is compared to the prior art arrangement of a work vehicle. In FIG. 3, the solid lines show the present invention. The broken lines in FIG. 3 show a corresponding outline of a conventional work machine. Line 24 is a horizontal line. Line of sight 22 corresponds to a conventional bulldozer 40 as discussed above, and line of sight 21 corresponds to a work vehicle 30 according to the present invention, also as discussed above. The present invention can provide a line of sight 21 that is significantly lower than that of the conventional bulldozer. For example, the line of sight 21 in accordance with the present invention can increase visibility an amount, such as 10 to 30 degrees or more, preferably by about 23 degrees as shown by angle α in FIG. 3. The increase in visibility over the conventional line of sight 22 is shown by angle β.

A preferred arrangement of the work vehicle in accordance with the present invention includes the nose module 34 with a lowered front end and a cab 13 that is shifted forward as shown in FIG. 3. For example, the arrangement of the work vehicle in accordance with present invention permits the cab to be shifted forward along the x-axis a significant amount, such as about 500 mm, and permits the front end of the nose module to be lowered along the y-axis a significant amount, such as about 350 mm.

Figure 4:
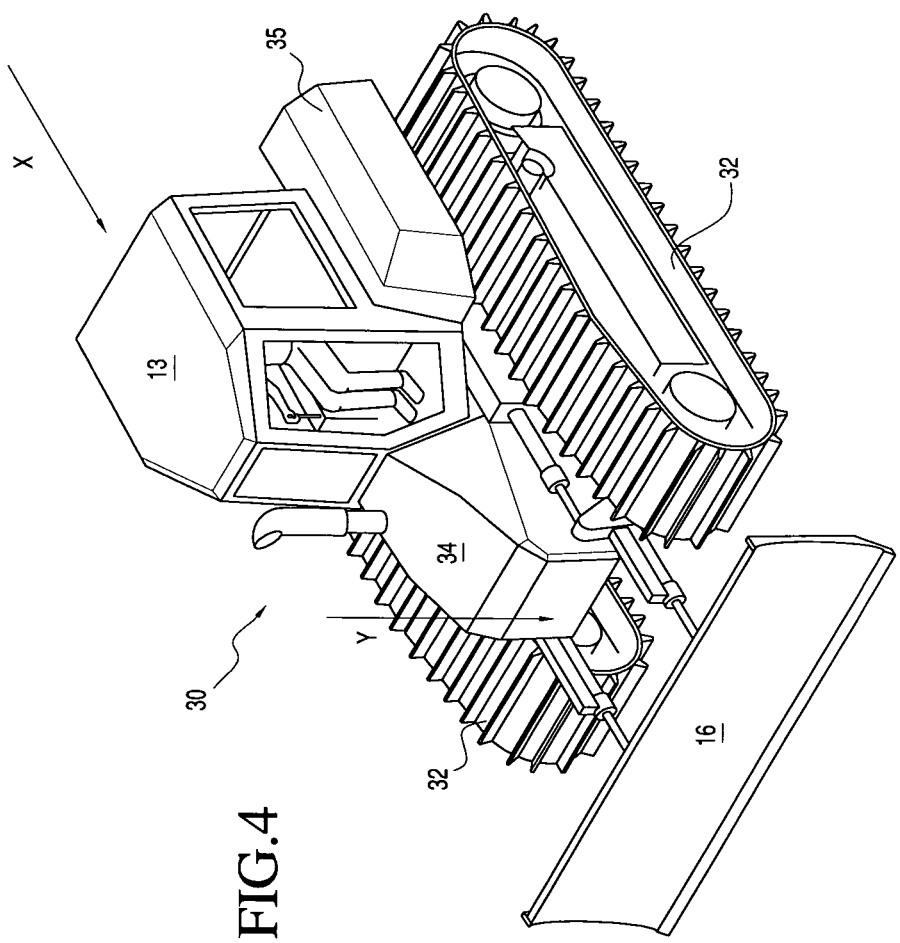
FIGS. 4 and 5 are front and rear perspective views of a bulldozer in accordance with the present invention.

The forward location of the cab along the x-axis and the downward location of the front of the nose module 34 along the y-axis are also shown in FIGS. 4 and 5. The arrangement of the work vehicle in accordance with present invention reduces the operator's blind area in front of the bulldozer blade to a length A or B, or by about 23 degrees or more as shown in FIGS. 2 and 3. The nose module can be designed to increase visibility by other degrees such as 10 degrees to 30 degrees or more. On the other hand, the arrangement of the conventional work vehicle requires a significant larger blind area for the operator having a length C, as shown in FIG. 1.

Figure 12:
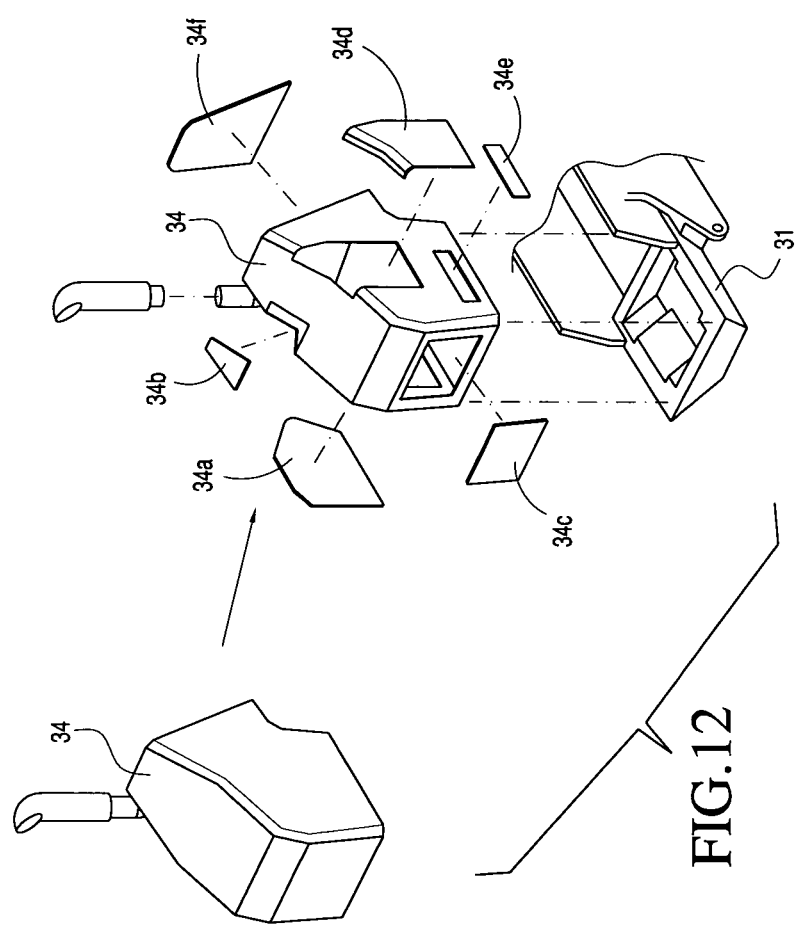
FIG. 12 is an exploded view of a nose guard structure and assembly way in accordance with the present invention.

In the present invention, the nose module 34 as shown in FIG. 12 is structured with front (34c), side (34a, 34b, 34d, 34e), and rear panels (34f that are welded, bolted, or otherwise secured together. The nose module 34 can have a sufficiently closed structure that prevents outside air from contacting the engine during operation of the work. Gaskets or other sealant materials can be used between the panels 34a-34f and the main portion of the nose module 34 for sealing the module and/or reducing vibration. A separate exhaust pipe is can be attached to the top of the nose module 34 by clamp. The nose guard 34 is attached to the main frame 31 by bolts or other appropriate means known in the art as shown in FIG. 11. The nose module 34 does not need to be ventilated. This is because there is no need to pull or push air through the engine compartment by fan, so that the air passes through a radiator for heat transfer. Thus, the engine cover or nose module 34 in the present invention can be closed. This prevents dirt from depositing on the engine and contaminating the engine parts from air as it passes over the engine, so that the interval of servicing the engine can be increased. The closed engine cover also reduces the noise of the engine. This improves the conditions of operation to be more efficient, safe, and acceptable to the environment. For these reasons, the present invention provides significant advantages over the conventional arrangement.

When air is pulled across the engine, one third of the heat rejection necessary to cool the engine can be radiated off the engine or engine block, another one third of the heat rejection goes out the exhaust, and a final third of the heat rejection is transferred to the coolant in the cooling system of the work vehicle. In the arrangement with the present invention where air is not pulled or pushed over the engine block, the radiator can be made bigger, if necessary. Any size increase of the radiator is reduced by the fact that air supplied to the radiator from around the work vehicle is cooler than that air supplied to the radiator after passing over the engine, so that a greater heat transfer is provided across the radiator. In other words, a greater cooling efficiency can be achieved across the radiator when it is not arranged next to the engine, because the engine does not heat the air before it passes through the radiator.

The invention was described above in a simple and practical manner. However, since numerous modifications and changes will readily occur to those skilled in the art, the invention it is not limited to the exact constructional and operational details disclosed, and accordingly all suitable modifications and equivalents fall within the scope of the present invention.

What we claim is:

1. A bulldozer comprising:
a vehicle frame having a front end and a rear end with a center longitudinal axis;
a pair of tracks disposed on left and right sides of the center longitudinal axis of the bulldozer, respectively, for supporting the vehicle frame, with the tracks extending rearwardly of the rear end of the vehicle frame to form a cooling module recess that is disposed laterally between the tracks and at a rear end portion of the frame along the center longitudinal axis;
a forwardly positioned operator seat secured to the vehicle frame at a location between the front and rear ends in front of the cooling module recess;
a bulldozer blade disposed in front of the front end of the vehicle frame and operatively coupled to the vehicle frame, the bulldozer blade including a top center portion disposed along the center longitudinal axis of the bulldozer;
a front mounted engine disposed at a front portion on the vehicle frame along the center longitudinal axis of the bulldozer that is in front of the operator seat and behind the bulldozer blade;
an engine cover covering the front mounted engine at the front portion of the vehicle frame, the engine cover being downwardly angled towards the bulldozer blade along the center longitudinal axis of the bulldozer and aligned vertically above the front mounted engine, the operator seat, the engine cover and the bulldozer blade being disposed such that, when a lowest point of the bulldozer blade and a lowest point of the tracks are generally on a horizontal plane, the top center portion of the bulldozer blade is visible over a top sloped surface of the engine cover;
a first tank module disposed on a rear of a first lateral side of the bulldozer; and
a cooling module fluidly coupled to the front mounted engine for cooling the front mounted engine, the cooling module being coupled to the rear end portion of the vehicle frame within the cooling module recess formed between the tracks, at least an upper end of the cooling module being recessed forwardly from a rear end of the first tank module, and a rearmost end of the cooling module being disposed forwardly of a rear end of the tracks.

2. The bulldozer as claimed in claim 1, wherein
a roof coupled to the vehicle frame and vertically disposed directly above the operator seat.

3. The bulldozer as claimed in claim 1, further comprising:
an operator cab secured to the frame behind the engine cover and surrounding the operator seat.

4. The bulldozer as claimed in claim 1, wherein
the cooling module includes a radiator core having a charged air cooling unit, an oil cooling unit and a water cooling unit, and a fan for moving air through the radiator.

5. The bulldozer as claimed in claim 3, wherein
the cooling module includes a radiator and a fan for moving air through the radiator, and the cooling module is mounted behind the cab such that a plane of the fan slopes downward towards the rear of the bulldozer.

6. The bulldozer as claimed in claim 1, wherein
the tracks are part of track frame modules that are attached to the vehicle frame.

7. The bulldozer as claimed in claim 1, wherein
the cooling module is completely recessed forwardly from the rear end of the first tank module.

8. The bulldozer as claimed in claim 1, wherein
the first tank module includes a tank fluidly coupled to the front mounted engine for supplying fuel to the front mounted engine.

9. The bulldozer as claimed in claim 1, wherein
the front mounted engine is disposed at least partially above an uppermost edge of the tracks.

10. The bulldozer as claimed in claim 9, wherein
the cooling module is completely recessed forwardly from the rear end of the first tank module.

11. The bulldozer as claimed in claim 1, wherein
the engine cover is generally closed.

12. A bulldozer comprising:
a vehicle frame having a front end and a rear end with a center longitudinal axis;

a pair of tracks extending in a forward-to-aft direction on left and right sides of the center longitudinal axis of the bulldozer, respectively, for supporting the vehicle frame, with the tracks extending rearwardly of the rear end of the vehicle frame to form a cooling module recess that is disposed laterally between the tracks and at a rear end portion of the frame along the center longitudinal axis;

a front mounted engine supported on a front portion of the vehicle frame at a location along the center longitudinal axis of the bulldozer;

a cooling module fluidly coupled to the front mounted engine for cooling the front mounted engine, the cooling module arranged at the rear end portion of the vehicle frame within the cooling module recess formed between the tracks such that a rearmost end of the cooling module is disposed forwardly of a rear end of the tracks;

a forwardly positioned operator seat secured to the vehicle frame at a location behind the front mounted engine and in front of the cooling module recess;

a moveable bulldozer blade disposed in front of the front end of the vehicle frame; and an engine cover coupled to the vehicle frame and covering the front mounted engine, with the engine cover having a top sloped surface extending along the center longitudinal axis of the bulldozer and aligned vertically above the front mounted engine such that the top sloped surface of the engine cover is downwardly angled towards the bulldozer blade along the center longitudinal axis of the bulldozer, the top sloped surface of the engine cover and the bulldozer blade being disposed with respect to each other such that a line extending on and forwardly from the top sloped surface of the engine cover intersects with a top center portion of the bulldozer blade when the bulldozer blade is placed on the ground.

13. The bulldozer as claimed in claim 12, wherein the front mounted engine is disposed at least partially above an uppermost edge of the tracks.

14. The work vehicle as claimed in claim 12, further comprising:
a first tank module disposed on a rear of a first side of the bulldozer, with a rear end of the cooling module being disposed forward of a rear end of the first tank module.

15. The bulldozer as claimed in claim 14, further comprising:
a second tank module disposed on a rear of a second side of the bulldozer, with the rear end of the cooling module being disposed forward of a rear end of the second tank module.

16. The bulldozer as claimed in claim 15, wherein the second tank module is for supplying hydraulic fluid to the bulldozer blade and the first tank module is for supplying fuel to the front mounted engine.

17. The bulldozer as claimed in claim 12, further comprising:
a roof coupled to the vehicle frame and vertically disposed directly above the operator seat, with an eye point located between the roof and the operator seat in which the top center portion of the bulldozer blade is visible from the eye point over the top sloped surface.

18. The bulldozer as claimed in claim 12, wherein the cooling module includes a radiator core having a charged air cooling unit, an oil cooling unit and a water cooling unit, and a fan adjacent the radiator core.

19. The bulldozer as claimed in claim 12, further comprising:
an operator cab secured to the frame behind the engine cover, such that the operator seat and an eye point are located in the cab in which the top center portion of the bulldozer blade is visible from the eye point over the top sloped surface.

20. A bulldozer comprising:
a vehicle frame having a front end and a rear end with a center longitudinal axis;

a pair of tracks disposed on left and right sides of the center longitudinal axis of the bulldozer, respectively, for supporting the vehicle frame, with the tracks extending rearwardly of the rear end of the vehicle frame;

a forwardly positioned operator seat secured to the vehicle frame at a location between the front and rear ends;

a bulldozer blade disposed in front of the front end of the vehicle frame and operatively coupled to the vehicle frame, the bulldozer blade including a top center portion disposed along the center longitudinal axis of the bulldozer;

a front mounted engine disposed at a front portion on the vehicle frame along the center longitudinal axis of the bulldozer in front of the operator seat and behind the bulldozer blade;

an engine cover covering the front mounted engine, with the engine cover having a top sloped surface extending along the center longitudinal axis of the bulldozer and aligned vertically above the front mounted engine such that the top sloped surface of the engine cover is downwardly angled towards the bulldozer blade along the center longitudinal axis of the bulldozer, the top sloped surface of the engine cover and the bulldozer blade being disposed with respect to each other such that a line extending on and forwardly from the top sloped surface of the engine cover intersects with a top center portion of the bulldozer blade when the bulldozer blade is placed on the ground;

a first tank module disposed on a rear of a first lateral side of the bulldozer;

a second tank module disposed on a rear of a second lateral side of the bulldozer with a cooling module recess being formed laterally between the first and second tank modules at a rear end portion of the frame along the center longitudinal axis; and a cooling module fluidly coupled to the front mounted engine for cooling the front mounted engine, the cooling module being coupled to the rear end portion of the vehicle frame within the cooling module recess with a rearmost end of the cooling module being recessed forwardly from rear ends of the first and second tank modules.

21. The bulldozer as claimed in claim 20, wherein the cooling module includes a radiator and a fan for moving air through the radiator, with at least an upper end of a rear side of the cooling module is positioned forward with respect to a lower end of the rear side of the cooling module.

22. The bulldozer as claimed in claim 20, further comprising
an operator cab surrounding the operator seat, the operator cab being disposed between the first and second tank modules and secured to the vehicle frame behind the engine cover, the operator cab including an opening for allowing an operator to get in and out of the operator cab with the opening being disposed on a side one of the first and second tank modules is arranged, a front end of the one of the first and second tank modules being disposed rearwardly of a rear end of the opening and the rear end of the one of the first and second tank modules being disposed rearward of a rear surface of the operator cab, the cooling module being disposed rearward of the operator cab.

23. The bulldozer as claimed in claim 22, wherein
the operator cab includes a rear window disposed on the rear surface of the operator cab with a bottom end of the rear window being arranged above a top end of the cooling module.

24. The bulldozer as claimed in claim 22, wherein
the cooling module is mounted in the cooling module recess so that a rear side of the cooling module is exposed.

25. The bulldozer as claimed in claim 21, wherein
the rear end of the cooling module is recessed forwardly from the rear ends of the first and second tank modules so that a rearward line of sight is formed from the eye point above the operator seat to ground that passes between the first and second tank modules as viewed in a direction perpendicular to a vertical plane passing through the center longitudinal axis of the vehicle frame.

26. The bulldozer as claimed in claim 21, wherein
the second tank module includes a tank fluidly coupled to the bulldozer blade for supplying hydraulic fluid to the bulldozer blade and the first tank module includes a tank fluidly coupled to the front mounted engine for supplying fuel to the front mounted engine.

* * * * *